United States Patent [19]

Dyck

[11] 4,288,985
[45] Sep. 15, 1981

[54] APPARATUS FOR GENERATING ENERGY FROM THE RISE AND FALL OF TIDES

[76] Inventor: Richard G. Dyck, 1120 Longfellow Dr., Beaumont, Tex. 77706

[21] Appl. No.: 102,142

[22] Filed: Dec. 10, 1979

[51] Int. Cl.³ .............................................. F16D 33/00
[52] U.S. Cl. ....................................... 60/398; 60/497; 137/132; 290/53
[58] Field of Search ................ 60/398, 497, 502, 503; 290/42, 53, 52; 137/123, 132

[56] References Cited

U.S. PATENT DOCUMENTS

| | | | |
|---|---|---|---|
| 1,457,170 | 5/1923 | Huguenin | 290/42 X |
| 3,391,903 | 7/1968 | Peterson, Jr. | 60/398 |
| 3,426,540 | 2/1969 | Fixel | 290/42 X |
| 3,925,986 | 12/1975 | Barwick | 60/398 |
| 3,980,894 | 9/1976 | Vary et al. | 60/398 X |
| 4,039,847 | 8/1977 | Diggs | 290/42 |
| 4,098,081 | 7/1978 | Woodman | 60/398 |
| 4,103,490 | 8/1978 | Gorlov | 60/398 |
| 4,117,676 | 10/1978 | Atencio | 60/398 X |
| 4,180,976 | 1/1980 | Bunn | 137/123 X |
| 4,182,123 | 1/1980 | Ueda | 60/398 X |

FOREIGN PATENT DOCUMENTS 1065205 1/1954 France ................................. 60/398

Primary Examiner—Allen M. Ostrager
Assistant Examiner—Stephen F. Husar

[57] ABSTRACT

An apparatus is disclosed which is capable of producing usable energy as a result of the rise and fall of ocean tides. A second reservoir is connected to a natural reservoir such as the ocean by means of a duct system wherein the duct openings in the two reservoirs are established at levels which will constantly be submerged. Upon charging the duct system with water, the siphon principle will urge the flow of water back and forth through the duct system between the two reservoirs as the water in the second reservoir seeks a level of equilibrium with that of the ocean. A turbine is mounted in the duct system and is driven by the substantially continuous flow of water back and forth through the system thereby producing a source of useable energy.

2 Claims, 2 Drawing Figures

4,288,985

APPARATUS FOR GENERATING ENERGY FROM THE RISE AND FALL OF TIDES

BACKGROUND OF THE INVENTION

1. Field of the Invention

The present invention relates to an apparatus for generating power from the continuous rise and fall of tides. More particularly, the invention involves the generation of power from the flow of water in an airtight duct between two reservoirs as the water in these reservoirs seeks a level of equilibrium.

2. Description of the Prior Art

Devices for utilizing the rise and fall of the tides or utilizing wave action as a means of producing energy are well-known in the prior art. For example, devices have been designed such that wave action or the rise and fall of the tides will actuate rotating or reciprocating devices and thereby impart motion to mechanical systems to perform such functions as lifting water for irrigation. Such devices commonly involve the compression of air within storage tanks or pipes for subsequent use in the production of power. Tidal motion and wave action have also frequently been used to drive electrical generators. For example, reference is made to the April 1978 "Energy From the Ocean" Report of the Subcommitte on Advanced Energy Technologies and Energy Conservation Research, Development and Demonstration of the Committee on Science and Technology for the U.S. House of Representatives which describes potential schemes as well as actual tidal power plants at Rance, France and Kislaya Guba in the Soviet Union.

U.S. Pat. No. 4,039,847 discloses an apparatus designed to harness the energy of tidal currents. Basically, this system involves the placement of movable overflow type turbines in a position where they can be driven by both the incoming flood tides and the outgoing ebb tides.

Other inventions, such as disclosed in U.S. Pat. Nos. 3,925,986 and 4,103,490, involve the use of tidal chambers wherein the rise and fall of ocean tides is utilized to create either positive air pressure or partial vacuums within said chambers. These forces are then used to operate other power mechanisms.

A problem with all these inventions is the intermittent characteristic of the wave or tidal motion being utilized. The inherently inconsistent action of these natural forces creates a problem in making the harnessed power available as a relatively steady source. The circumstance has been addressed in several ways. For example, in U.S. Pat. No. 4,098,081, the invention discloses the use of a plurality of tidal chambers which are filled in succession during the rising tide and then sequentially emptied during the falling tide, with power being generated as a result of the use of the air pressure and partial vacuums created within the tidal chambers.

In U.S. Pat. No. 3,391,903, an apparatus utilizing the siphon principle to urge water in a single direction from a reservoir of a higher level to a reservoir of a lower level is described. As long as the level of water in the first reservoir remains higher than the level in the second reservoir, the flow of water will be continuous, resulting in the availability of a constant flow for driving a turbine. However, in this device the continous flow of water is dependent upon the constant replenishing of water in the first reservoir by the action of waves splashing over its sides. Necessarily, the continuous generation of power from this device is dependent upon sufficient wave action, a condition which is not consistent or controllable.

SUMMARY OF THE INVENTION

A feature of the present invention is the capability of generating energy from the rise and fall of the tides.

Another feature of the present invention is that relatively simple apparatus involving only a few moving parts is necessary and that this apparatus is of simple construction.

Yet another feature of the present invention is that the apparatus will provide a substantially continuous flow of water, and therefore a source of substantially more continuous energy production.

The apparatus of this invention involves the use of the siphon principle to urge the flow of water between a natural reservoir such as the ocean, which is subject to level variations due to tidal flow and a second man-made reservoir or a natural reservoir appropriately modified for utilization with this invention. The two reservoirs are connected by an airtight duct, filled with water, and through which water will be drawn because of the siphon principle as the water levels in the two reservoirs seek a state of equilibrium. Affixed within the duct is an energy converter such as a turbine or a Water Low Velocity Energy Converter (WLVEC) which are driven by the flow of water from one reservoir to the other. Final conversion of the energy is accomplished through a generator which communicates with the energy converter but is situated outside the duct system.

The second or man-made reservoir is constructed to have a depth which exceeds the level of the lowest tide and a height which exceeds the level of the highest tide of the first natural reservoir. The duct openings are situated at levels in each reservoir which are constantly submerged, assuring that once the duct system is charged with water, the siphon effect will cause water to flow from one reservoir to the other as the tide level changes. As the tide comes in, the level of the first reservoir rises and exceeds the level of the second reservoir. Water is caused to flow from the first reservoir to the second reservoir as those two bodies of water seek a level of equilibrium. Conversely, when the tide moves out, the level of water in the first reservoir drops below that of the second reservoir thereby causing the water flow to reverse in the duct system and move back to the first reservoir.

A single turbine, capable of being driven by water flow from either direction, may be used. Further, additional velocity for the water flow entering the turbine may be achieved by constricting the inside diameter of the duct in the immediate areas fore and aft of the turbine.

In another aspect of the invention, two turbines may be utilized in the duct system such that one turbine receives the water flow as the tide moves in and the other as the tide moves out. A bypass channel, with appropriate valving in the vicinity of the turbines, would permit the water to flow through the active turbine, but bypass the inactive turbine and thereby decrease the system resistance to the water flow. A Water Low Velocity Energy Converter (WLVEC) or other conversion mechanism might be substituted for the turbines.

Examples of the more important features of this invention have thus been summarized rather broadly in order that the detailed description that follows may be better understood, and in order that the contribution to the art may be better appreciated.

BRIEF DESCRIPTION OF THE DRAWINGS

Additional features and advantages of the present invention will become apparent with reference to the following detailed description of a preferred embodiment thereof in connection with the accompanying drawings wherein like reference numerals have been applied to like elements, in which.

DETAILED DESCRIPTION OF THE INVENTION

Figure 1:
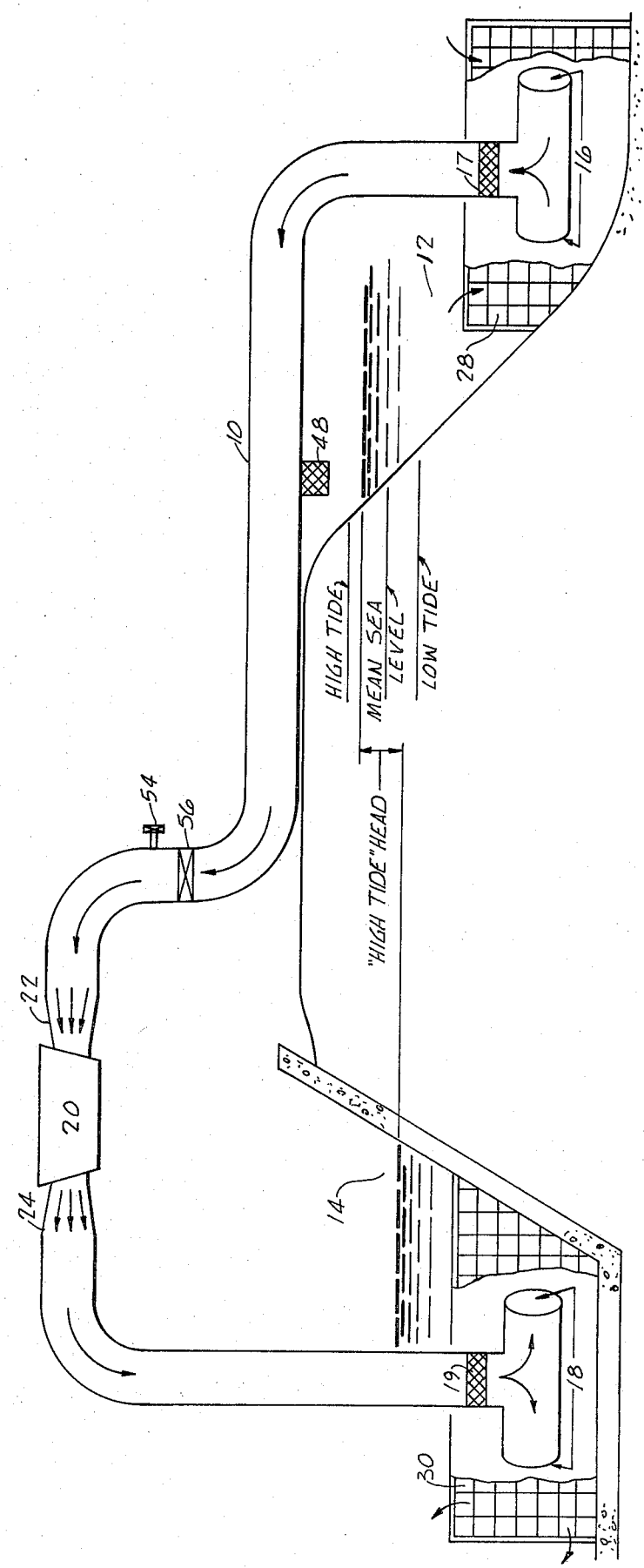
FIG. 1 is a plan view of an embodiment of the present invention during a phase of rising tide.
Figure 2:
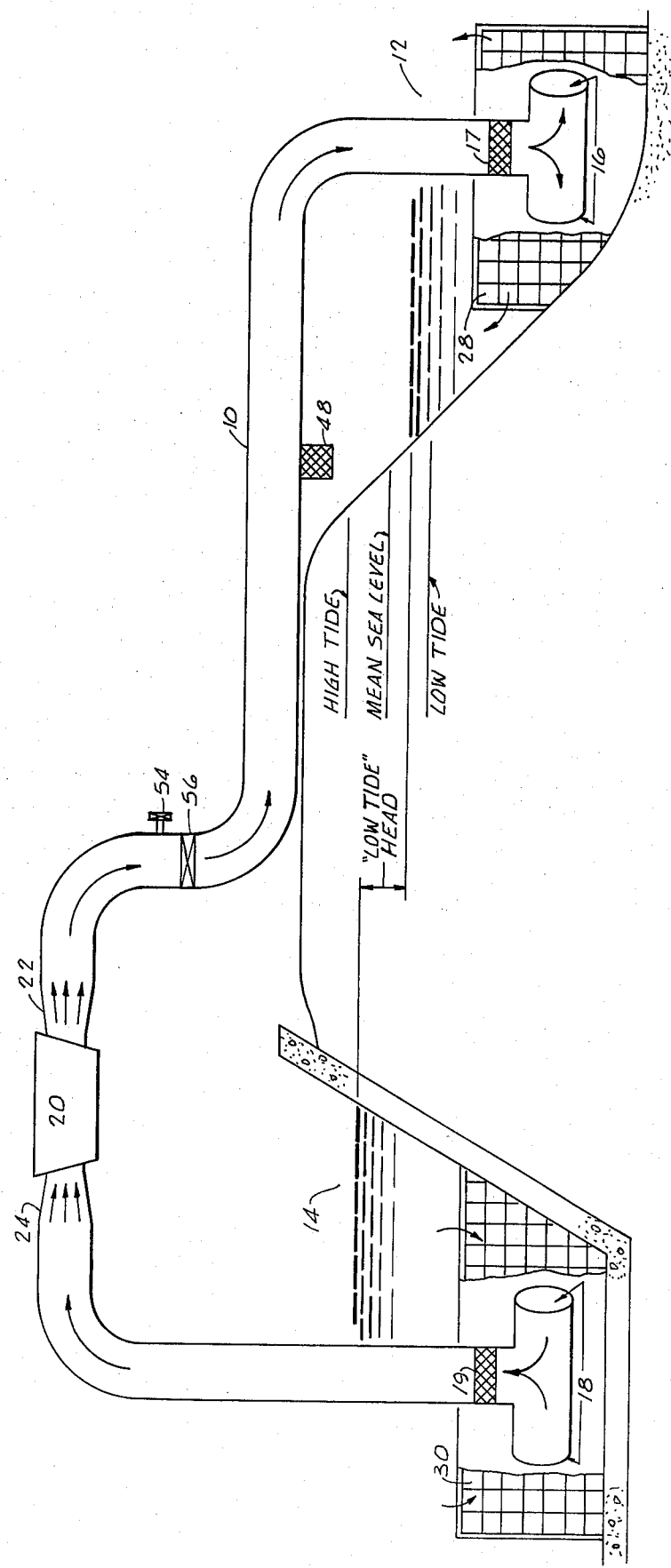
FIG. 2 is a plan view of an embodiment of the present invention during a phase of ebbing tide.

Turning first to FIG. 1 there is shown an airtight duct system 10 constructed to connect a natural reservoir 12, which is subject to a change in sea level due to tidal action, and a second reservoir 14. The support structure necessary to sustain the duct system is not shown. Various means of supporting a system such as this are possible and will be apparent to those of ordinary skill in this field. The duct system has openings 16 communicating with the natural reservoir and openings 18 communicating with the second reservoir. The duct system must be constructed such that duct openings 16 and 18 are always submerged, which requires that these openings be at a level which is at least lower than the level of the lowest tide for that geographic region.

The second reservoir 14 should be constructed with a depth which is below the level of the lowest tide for the particular area in which the reservoir is constructed or situated. The total depth of the second reservoir normally need only be enough to accommodate the continuous submergence of the duct openings 18 and the differential in height between the lowest tide and highest tide for that region. However, the duct openings 18 for the second reservoir may be arranged in a well within that reservoir such that the depth for the entire second reservoir would not have to fall below the sea-level of the lowest tide of the natural reservoir.

Once the duct system 10 is properly situated such that duct openings 16 and 18 are positioned at appropriate levels, the duct system must be charged with water. Charging involves the filling of the duct system with water such that all air is expelled therefrom. Charging may be accomplished by any known means such as use of a pump to force water through the duct. A drain and recharge valve 54 may be provided in the duct system for purposes of charging. Once charged, the airtight duct system will remain water filled as long as the duct openings always remain under water. A closed system then exists, and the siphon principle will cause water to flow from one reservoir to the other whenever the water level in one exceeds the level in the other. The continuous changing of the water level of the natural reservoir due to the movement of the tides will cause water to flow through the duct system as the water level in the second reservoir seeks a condition of equilibrium with the natural reservoir. The overall size, structure and support for the duct system will be determined by assessing the amount of energy it is desired to produce in conjunction with the economics involved for the construction.

A turbine 20 is situated in the duct system in a position to receive and be driven by the flow of water between the reservoirs. The generator for final conversion of the flow energy to electrical energy is not shown but would exist outside the duct system and cooperate with the turbine by means well-known to those skilled in the art. Turbine 20 may be constructed so as to be driven by the flow of water from either direction through the duct system. Alternatively, two single direction turbines could be utilized, one to be driven by the incoming flow and the other by the outgoing flow.

The velocity of the water flow through the duct system will be directly related to the size of the "head", which is the difference in height between the levels of the two reservoirs. At various times throughout the daily cycle, the two reservoirs will quickly pass an approximate state of equilibrium. As equilibrium is approached, the flow of water through the duct system will decrease in velocity and will theoretically come to a standstill at the moment of equilibrium. The direction of the flow of water will then reverse and gradually increase in velocity as the sea level of the natural reservoir changes with respect to the second reservoir. Brief lull periods will exist in the ability of the system to generate energy during this time when the direction of flow of the water is changing. In order to extend the time when there will be a sufficient velocity of the water to drive the turbines, the duct system is provided with duct constrictions 22 and 24. By increasing the velocity of the water flow in the area of the duct system adjacent to the turbine, the brief period during which the velocity of the water would otherwise be insufficient to drive the turbine is further decreased. A shut off valve 56 may be installed in the duct system to stop all water flow during the lull periods and until an adequate head has been created to justify reactivation of the system.

As previously described, duct openings 16 and 18 are situated at levels which will be constantly submerged. While a single opening may be utilized, a tee-type opening into the main duct may be used to decrease the possibility that debris might block the system openings. This would also allow tidal currents to pull water through the openings 16 and enhance the siphon effect during an ebbing tide.

In order to further prevent the clogging of the duct system and the introduction of particles which would damage or reduce the efficiency of the turbines, or energy converting means, a baffle means may be employed. Deflection of debris may be accomplished through use of baffling screen or louvres 28 and 30 in the vicinity of duct openings 16 and 18 respectively. These elements will act to restrain and divert debris which might otherwise be sucked into the duct system. The baffles could be of any known construction, and in addition to screens, could include perforated or slotted cones circumventing the duct system openings.

Filter elements 17 and 19 are provided within the duct system relatively close to duct openings 16 and 18 respectively. Filters 17 and 19 are designed to prevent foreign matter and particles which do enter the duct system from reaching and damaging the turbines or reducing their efficiency. Drop filter 48 is also provided in the duct system as a further measure to eliminate particles from the water flow.

As noted, the duct system must necessarily be airtight and fully charged with water before the siphon principle will induce water to flow through the duct system in response to the differential water level in the two reservoirs. Drain and recharge valve 54 may be provided in the duct system to facilitate the initial charging of the system as well as to permit additional water to be added should the system lose its charge, or to drain the system.

As previously described, when a state of equilibrium is approached, and the water velocity decreases, a brief period will occur where the velocity will be insufficient to drive the turbine or energy converting means. Until the system has reversed itself and sufficient velocity achieved to again drive the turbine, no energy will be available from the system. By constricting the inside diameter of the duct in the area immediately above the turbine or turbines, the water velocity impacting on the turbine may be increased and will shorten the lull period which accompanies the shifting of the water flow direction as the reservoirs pass the state of equilibrium. As indicated, low velocity energy converting means may also be utilized in place of a turbine to further reduce the periods when energy can not be generated.

The length of time during which the water will flow from one reservoir to the other will also be affected by the size of the second reservoir. A reservoir of small area will necessarily fill quicker such that its water level will rise in closer correspondence to the rise of the ocean level. This situation would result in a small head and thus a lesser velocity of water flow through the duct system. By increasing the size of the second reservoir such that the flow of water through the duct system cannot be sufficient to achieve a rise or fall of the water level in timely correspondence with the rise and fall of the sea level in the first reservoir, a larger head, and hence an increased velocity of the water through the operating turbine, may be obtained.

The foregoing description of the invention has been directed to particular embodiments thereof, including a preferred embodiment, in accordance with the requirements of the Patent Statutes and for purposes of explanation and illustration. However, it will be apparent to those skilled in this art that modifications and changes in the apparatus may be made without departing from the scope and spirit of the invention. For example, two one way turbines may be used, one for flow in each direction, where the turbines are situated in separate portions of the duct system. This arrangement could function with or without the use of separate bypass channels and accompanying valving. These, and other modifications of the invention will be apparent to those skilled in the art. It is the applicant's intention in the following claims to cover all such equivalent modifications and variations which fall within the true spirit and scope of the invention.

What is claimed is:

1. Apparatus for generating energy from the rise and fall of the tides comprising:
   a first reservoir, the first reservoir being subject to tidal flow;
   a second reservoir which is separated from the first reservoir and having a depth below the level of the lowest tide of the first reservoir and a height exceeding the highest tide of the first reservoir;
   a duct, airtight and chargeable with water, connecting the first reservoir with the second reservoir;
   tee-shaped channel elements at each end of the duct, with the vertical portion of the channel elements communicating with the duct and the two openings of the horizontal portion of the channel elements communicating with the first and second reservoirs;
   filter elements situated in the duct in the vicinity of the openings of each tee-shaped channel element;
   deflection screens surrounding the vicinity of the openings of each tee-shaped channel element;
   a drop filter situated along the duct;
   a charging and drain valve arranged in the duct;
   a shutoff valve arranged in the duct; and
   a turbine positioned within the duct and adapted to be operated by the flow of water passing between the first reservoir and second reservoir as tidal flow causes a change in the level of water in the first reservoir and the water in the second reservoir is urged to seek a level of equilibrium with the water in the first reservoir.

2. The apparatus of claim 1 wherein the duct has constricted flow areas immediate adjacent the turbine.

* * * * *